Oct. 18, 1955 G. G. LANDIS ET AL 2,721,249
HIGH-SPEED ARC WELDING
Filed Dec. 12, 1952 3 Sheets-Sheet 1

INVENTORS,
GEORGE G. LANDIS
EMMET A. SMITH
BY
Alfred C Body

Oct. 18, 1955  G. G. LANDIS ET AL  2,721,249
HIGH-SPEED ARC WELDING

Filed Dec. 12, 1952  3 Sheets-Sheet 3

INVENTORS,
GEORGE G. LANDIS
EMMET A. SMITH
BY
Alfred C. Body

United States Patent Office 2,721,249
Patented Oct. 18, 1955

2,721,249

HIGH-SPEED ARC WELDING

George G. Landis and Emmett A. Smith, Cleveland, Ohio, assignors to The Lincoln Electric Company, Cleveland, Ohio, a corporation of Ohio Application December 12, 1952, Serial No. 325,592

16 Claims. (Cl. 219—10)

This invention pertains to the art of arc welding and, more particularly, to method and apparatus for carrying out continuous high-speed arc welding.

This application is a continuation in part of our copending application Serial No. 158,996 filed April 29, 1950 and now abandoned.

The present invention is particularly adaptable to the field of arc welding wherein a wire electrode of indeterminate length is continuously fed toward a workpiece to be welded while being electrically energized through an electrode nozzle or contact block positioned adjacent to the workpiece such that an arc is struck and maintained between the electrode and workpiece to melt off the electrode and fuse the workpiece and will be particularly described with reference thereto, although it will be appreciated that it has broader applications.

The present invention in many ways constitutes an improvement over the method and apparatus for high-speed arc welding described in United States Patent No. 2,444,834 to George G. Landis and Norman J. Hoenie dated July 6, 1948 and assigned to the assignee of this application. In that patent, arc-welding apparatus and method of the type just referred to is described wherein electrode wires of smaller than normal diameter are employed in combination with higher than normal welding current densities in the portion of the electrode sticking out beyond the contact block, this portion being normally called the stickout portion.

Melt-off rates much higher than ever theretofore experienced were obtained by following the teachings of this patent. For example, and as stated in the patent or as realized in commercial practice, it is possible to easily obtain melt-off rates of the electrode wire of as much as .45 pound of metal per minute and to obtain correspondingly high speeds, particularly lineal speeds, in performing any welding operation.

In accordance with the teachings generally set forth in this patent, the stickout distance; that is, the distance from the contact block to the workpiece, was that generally contemplated in the welding art; namely, on the order of ¾ of an inch. However, the electrode sizes were smaller than that normally employed; namely, generally from ³⁄₆₄ to ⅛ of an inch and welding currents were imposed on the electrode stickout portion much higher than normally employed; namely, currents having a density of 60,000 amperes per square inch of electrode area or more.

As now appears more fully as a result of the present invention, these results may be explained generally by the fact that with such a high current density in the stickout portion of the electrode, the resistance heating thereof becomes a consequential factor in the melting down of the electrode while, at the same time, the intense heat developed by the arc is utilized to interfuse the electrode metal with that of the workpiece. Thus, as is now known, the currents passing through the stickout portion of the electrode tended to heat this stickout portion so that less energy had to be absorbed from the arc to raise the temperature of the electrode end to the fusion temperature of the metal. The desirability of using such resistance heating not recognized previously to the discovery on which this Landis patent is based is, in large part, due to the fact that resistance heating of the stickout portion increases with the square of the current and not in direct proportion thereto as in the case of heating the electrode only by the arc at the end thereof.

The length of the stickout portion has not been one of arbitrary choice in the welding art, particularly when the small-diameter electrodes were employed. Thus, one of the problems which resulted from the use of such electrodes is that of the tendency of the free end of the electrode to wander relative to the weld line, producing an uneven or ragged weld. This wandering of the free electrode tip may be caused by a number of different factors such as the release of the inherent locked-in stresses and strains in the electrode wire caused by the wire-forming operation during the electrode manufacture, by the softening of the wire due to the heating operation and, particularly, because of the inherent curvature of the wire due to its having been wound on a drum for proper storage. Regardless of the cause, there is a tendency for the free end of the electrode, as it emerges from the electrode nozzle, to flip or jump around. For this reason, the tendency when arc welding with small-diameter electrodes has been to hold the stickout length down as much as possible, the ¾ of an inch previously referred to having generally been considered the ideal amount of stickout for small-diameter wire electrodes. Anything less than this resulted in spattering of the nozzle from the molten material in the arc or difficulties of heating of the nozzle from the proximity of the arc.

In the art of arc welding, the lineal speed of any welding operation is, to a large extent, dependent upon the melt-off rate of the electrode. The melt-off rate, in turn, has always been proportional to some function of the welding current, either directly proportional in accordance with the teachings of the art prior to the Landis patent, or generally proportional to the square of the current in accordance with the teachings of the Landis patent. Thus, a welding operator had to adjust his welding operation by selecting a welding current to give him the desired depth of penetration of the weld into the workpiece and then adjust the lineal speed of the welding operation to correspond to the melt-off rate which he obtained at that current. Stated alternatively, the welding operator was generally bound by rigid relationships between the depth of penetration, the melt-off rates and the lineal speed of the welding operation. Prior to the present invention, no means, as far as we know, were known for varying these rigid relationships.

It appeared generally that the ultimate of melt-off rate of an electrode had been obtained in the Landis patent. While theoretically the melt-off rate could have been increased without limit by using higher and higher currents and feeding the electrode wires at correspondingly faster and faster rates, it was soon found that theory collided with the practicabilities of welding practice and that if the current and current densities were increased beyond certain limits, other problems soon present themselves; such as, undercutting of the bead, too deep penetration of the workpiece and, in some cases, an entire lack of fusion of deposited weld metal with the parent metal of the workpiece.

The problem of too deep penetration also became apparent where it was desired to use the disclosure of this patent on metal parts of relatively thin gauge. Here, even though currents and current densities in the lower range of the patent were employed, the penetration was often too deep for the gauge of the metal to obtain successful welds. Thus, heretofore, with the thin-gauge metals, difficulties were experienced in using the method of this patent.

Other limitations in obtaining increased melt-off rates of the electrode are imposed by the fact that the voltage range in which a welding arc may be struck and maintained is not only relatively low but is also quite definitely limited; that is, it will lie between 25 and 45 volts. There is, thus, no opportunity for any substantial change in the welding operation by any variation in the actual voltage maintained across the electric arc. In fact, the voltage is determined by other factors.

The present invention contemplates apparatus for arc welding including means for continuously feeding a wire electrode of indeterminate length toward a workpiece to be welded, the electrode being electrically energized by an electrode nozzle or contact block positioned adjacent to the workpiece such that an arc may be struck and maintained between the electrode end and the workpiece and the method for such welding, which enables even higher melt-off rates than that obtainable using the disclosure of the Landis patent for the same arc-welding currents or current densities in the stickout portion of the electrode, which enables equivalent melt-off rates for lower arc currents, which enables the performance of high-speed electric arc welding with relatively low workpiece penetration, which provides a ready adjustment of the melt-off rates of the electrode independently of the arc current or voltage, which enables the effective high-speed welding of thin-gauge metals, which avoids the problems of a free electrode end flipping around relative to the weld seam and which is otherwise simple and positive in operation.

In accordance with the present invention, the electrical contact means are spaced from the workpiece a distance greater than ever heretofore thought desirable to increase the stickout length of the electrode beyond the contact means and a current density is imposed on this stickout or terminal portion of such a value when considered in relation to the rate of speed of the electrode and the diameter thereof that the current will raise the arc end of the portion by resistance heating thereof and independently of the heat from the arc to an elevated temperature of at least above 500° F., preferably above 1200° F. and generally approaching the melting temperature of the metal of the electrode, which metals may, without limitation, be steel, copper, aluminum, brass or the like, the melting temperature of which are all well known or readily determinable. Such stickout distances may vary from slightly more than normal up to and including any distance, although from 1½ inches to 8 or 10 have been found quite suitable in practice.

We have found that by so increasing the length of the stickout or terminal portion of the electrode and using the current values indicated, it is possible to obtain melt-off rates of the electrode as large as 6 times that described in the above referred to Landis patent under very carefully controlled laboratory conditions and from 4 to 5 times under the more usual conditions such as would be encountered in actual commercial practice. It has also been found that for any given welding current and any given size of electrode wire, the melt-off rates can be easily adjusted to any desired amount within the limits of the invention by adjusting the length of the stickout; that is to say, by adjusting the spacing of the electrical contact means by which the electrode is energized from the workpiece.

Stated in an alternative manner, if a desired melt-off rate is known and a desired penetration is known which, of course, is determined by the welding current, then these two important factors in a welding operation may be properly brought into balance by adjusting the length of the stickout.

Also, the melt-off rates of the above referred to Landis patent can be easily obtained by using arc-welding currents and current densities in the electrode much lower than are specified therein for the equivalent melt-off rate. These startling results may be, in part, explained by reference to the basic laws of the heating of metals by the passage of electrical currents therethrough. As is known, the heating of a unit length of the electrode is a function of the resistance of this unit length, the square of the current and the time during which the current flows through the unit length.

By increasing the length of the stickout, the time for a unit length of the electrode to advance from the electrical contact means to the arc end of the electrode is substantially increased even though the unit length is now moving faster by virtue of the increased melt off. Thus, the electric arc-welding current flows through this unit length for a greater length of time. If the current density in the unit length is high enough to heat the unit length at a rate faster than the heat generated can be dissipated, such as by radiation, it will be seen that the unit length will become heated independently of the arc to higher temperatures by the time it reaches the arc end of the electrode than if the conventional stickout were used. If this heating rate and the ultimate temperature of the unit length is high enough, the only function which the arc must then perform is to either heat the end of the electrode the last few hundred degrees to the melting point and then fuse the end of the electrode and carry the molten metal across to the workpiece or, if the electrode is already at the fusion temperature, then simply fuse the electrode end and carry the fused metal across to the workpiece, the arc at the same time also serving the function of fusing the workpiece so that the molten metal of the electrode can thoroughly intermix therewith and form a weld bead.

The problem of the heating of the electrode end to the elevated temperature is considerably helped by the additional factor that the resistivity of the unit length increases very substantially at elevated temperatures so that the rate of the heating progressively increases in each unit length while it is progressing from the contact means to the arc end of the electrode. Thus, the unit length has a certain resistivity as it leaves the contact means. It immediately begins to heat due to the current flowing therethrough. As the unit length heats, however, its resistance increases which further tends to increase the rate of heating of the unit length. However, and as is generally not realized and was not appreciated prior to this invention, this resistivity does not increase at a uniform rate for each degree of temperature rise but, instead, increases at a progressively increasing rate. Thus, the percentage increase in resistivity per degree of temperature rise at, say 1000 degrees, is many times higher than it is at 100 degrees, and, in turn, is even many more times higher at 2000 degrees than it is at 1000 degrees. The sum total of this is that if the stickout length and the current density in the electrode is sufficient to heat the end of the electrode independently of the heat of the arc to only 1000 degrees, then a certain melt-off rate may be obtained. However, if the current is increased so that the end of the electrode will be heated to 2000 degrees independently of the heat of the arc, then the melt-off rate will have been proportionately increased. This proportionate increase, however, will be generally proportional to approximately the cube of the currents, as distinguished from the Landis patent where the melt-off rate varies generally by the square of the current and as further distinguished from the prior art prior to Landis where the melt-off rate varied in direct proportion to the current.

Olso, in accordance with the invention, apparatus of the general type described is provided having electrode guide means electrically insulated from and preferably adjustable relative to the electrical contact means and positioned between such means and the workpiece through which the stickout or terminal portion of the electrode passes so as to physically support this stickout portion and prevent its arc end from flipping or wandering around relative to the desired weld seam. Further, spacing means may be provided preferably adjustably mounted relatively to the electrical contact means adapted to physically contact the workpiece and provide accurate and uniform spacing of the contact means relative to the workpiece during an entire welding operation.

Such guide means and spacing means may be mounted relative to the contact means with a graduated scale so that the actual spacing of the contact means relative to the workpiece may, at all times, be indicated.

This scale may not only indicate the distance of the contact means from the workpiece but may also set forth the actual melting rate of the electrode which may be expected for any given welding current. Thus, the operator may determine the welding current which he desires and visibly adjust the amount of the stickout to give him the desired melt-off rate.

The principal object of the invention is the provision of a new and improved method and apparatus for electric arc welding wherein an electrically energized electrode is continuously fed toward a workpiece with an arc maintained between the end thereof and the workpiece, which permits of extremely high melt-off rates of the electrode, which permits of a ready adjustment of melt-off rates independent of the arc current or voltage and which is simple in construction and easy to operate.

Another object of the invention is the provision of a new and improved method of arc welding wherein the currents, the electrode size and the time which the current flows through the electrode are all so proportioned that the end of the electrode, by the time it reaches the arc end thereof, has been raised to a substantially elevated temperature substantially independently of any heat from the arc at the end of the electrode.

Still another object of the invention is a method and apparatus for arc welding of the type described wherein melt-off rates in excess of .5 pound per minute and upwards may readily be obtained using relatively conventional welding currents.

Still another object of the invention is the provision of means and method for adjusting the melt-off rate of the electrode substantially independent of the welding current.

Another object of the invention is to obtain higher melt-off rates of the electrode relatively proportionately to the arc currents than has ever heretofore been obtained.

Still another object of the invention is the provision of new and improved arc-welding apparatus including, in combination, means for continuously feeding an electrode of indeterminate length toward a workpiece, contact means for energizing the electrode and a power source connected between the contact means and the workpiece and so adjusted as to provide an arc-welding current of a sufficient density in the electrode to substantially heat same by its passage therethrough, the contact means being spaced from the workpiece a distance greater than normal whereby to substantially increase the heating effect of such current.

Still another object is the provision of apparatus of the type just referred to where means insulated from the contact means are provided for guiding the electrode in its movement from the contact means toward the workpiece.

Still another object is the provision of means for physically and positively spacing the contact means from the workpiece and preferably adjustable relative thereto so that the melt-off rate can be readily adjusted.

Other and more specific objects will occur to others upon a reading and understanding of a detailed description of preferred embodiments of the invention to be set forth hereinafter.

The invention is embodied in certain parts and combinations of parts and certain steps and combinations of steps, preferred embodiments of which will be described in detail in this specification and illustrated in the accompanying drawing which is a part hereof, and wherein.

Figure 1:
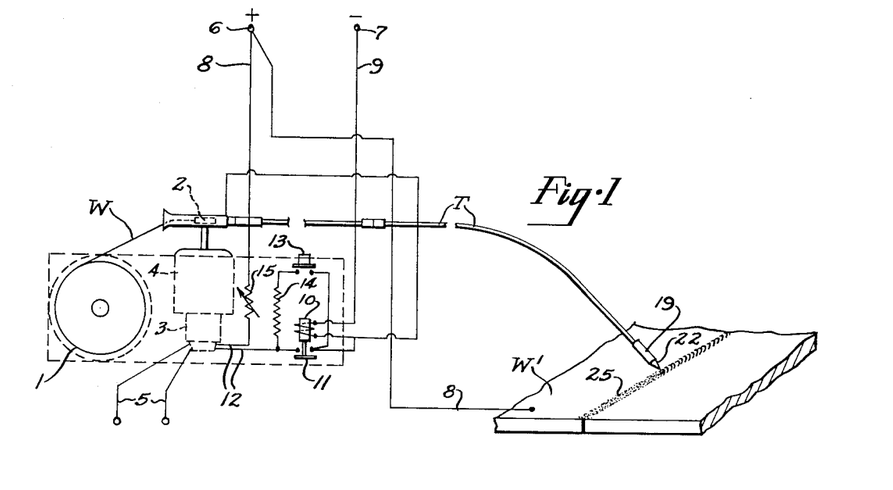
Figure 1 is a diagrammatic representation of one illustrative form of apparatus suitable for carrying out our improved method of arc welding.

Referring to the illustrative apparatus shown in Figure 1, the weld rod or wire W is shown as being drawn from a reel 1 by means of gripping rolls 2 in conventional manner, only one such roll appearing in said figure. The apparatus thus illustrated is substantially the same as that shown in previously cited Patent No. 2,444,834 and is primarily designed for use in feeding weld rod or wire of relatively small diameter; e. g., 1/16 inch to 5/64 inch, and at comparatively high rates of feed; e. g., approximately 300 inches per minute for such 1/16 inch D. wire and only slightly less for the 5/64 inch D. wire. Such illustrated apparatus moreover is primarily designed for use in manual or so-called semiautomatic arc welding in which the operator directly controls the traversing movement of the arc end of the electrode along the line to be welded. However, it will be understood that the present process is not limited to this particular manner of welding but is equally adaptable for use in so-called automatic welding in which relative traversing movement between the arc end of the electrode and the workpiece is mechanically controlled.

Proceeding with the description of the illustrated apparatus, the gripping rolls 2 are driven by motor 3 through a reduction or change speed gear box 4 whereby the rate of feed of the weld rod or wire W may be set, as indicated, for each of the several sizes or diameters of wire with which the apparatus is designed to be employed and to meet other conditions of use as will be hereinafter set forth. Furthermore, the current employed will be of such value in relation to the cross-sectional area of the weld rod or wire as to cause substantially instantaneous fusion of the end thereof whenever such end comes in contact with the workpiece.

Current is supplied to the field of motor 3 through leads 5, from a source of current independent of the welding current; e. g., from an ordinary 120 v. power line. The welding current may likewise be taken from any suitable source; e. g., from the terminals 6 and 7 of a welding machine (not shown), which will be provided with the usual means for varying the voltage and amperage of the current, as may be found desirable for any particular operation. However, it is not contemplated nor necessary that any changes in the setting of such machine, or, in other words, of the welding current, will be required to be made during the welding operation, or in fact for any given setup; i. e., any operation in which it has been determined at what rate the weld rod or wire is to be fed to the work and the current appropriate for the particular operation has been selected.

One of the adjacent terminals, preferably the positive terminal 6, is connected by means of a lead 8 with the workpiece W', while the other negative terminal 7 is connected by means of a lead 9 with a conductor which forms a part of a flexible tubular guide T, it being through such guide that the wire W is continuously fed to the point where the arc-welding operation is carried out.

Operation of the motor 3 is tied in with the welding operation by a series relay 10 which is operative by flow of welding current through the electrode lead 9 to close a switch 11 in one of the armature leads 12. In addition to this relay, there is included in such armature lead a push-button switch 13 which is adapted to connect the latter through a resistor 14. This last-mentioned switch is used to operate the motor to feed the wire when not welding; for example, in initially threading the wire through the tubular guide T. An adjustable resistor 15 will also be desirably included in the other such armature lead 12 to permit the armature current to be adjusted as desired.

The flexible tubular guide T is preferably, although not necessarily, composed of sections and the construction thereof forms no part of the present invention. As illustrated (see Figure 2), it comprises a main guide element or liner 16 in the form of a coil of hardened steel wire or equivalent wear-resisting material through which the weld rod or wire directly passes when being fed to the work. Surrounding such inner tube is a conductor sheath 17 formed of multistranded fine copper wire assembled and twisted about said inner tube much as are the component strands in a wire cable, such conductor 17 being, in turn, surrounded with a heavy sheath 18 of rubber or equivalent flexible insulating material.

Figure 2:
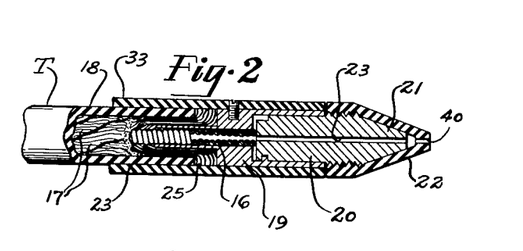
Figure 2 is a sectional view on a larger scale than Figure 1 of a detail of such apparatus showing the manner in which the weld rod or wire is brought into operative relationship to the workpiece.

The end of the tube, constructed as thus described, is shown as entering an externally insulated tubular coupling member 19 to which the adjacent end of the conductor member 17 is electrically connected as by brazing.

Inasmuch as the resistance of the liner 16 will greatly exceed that of the conductor sheath 17 (the latter may have a conductance several hundred times greater than the former), the welding current will be substantially entirely carried by the sheath to the terminal fitting contact block or electrode nozzle which is also illustrated in said Figure 2. This fitting comprises simply a tubular core 20, the outer end 21 of which is of conical form and is fitted with a sheath 22 of corresponding shape while the inner end is formed to have a bayonet or other detachable connection with the coupling 19. The core 20 is, thus, electrically connected through such coupling with the conductor sheath 17 and the bore 23 is of such diameter and longitudinal extent as to provide adequate electrical connection to the wire W as the latter passes therethrough. It will be understood that what has been referred to as the terminal portion or stickout of the electrode or wire is the portion that projects beyond the end of the core or nozzle.

It has been found that the wire as drawn from the reel and fed through the guide tube T will necessarily undulate sufficiently to press against the core 20 of the terminal fitting at a sufficient number of points to insure the free flow of current to its extremity and, thus, to the terminal portion or stickout of the wire.

As the present invention, as will appear, has to do with the effect of lengthening such terminal portion or stickout, the operation otherwise will be substantially as set forth in the above cited Patent No. 2,444,834. In other words, after selecting the particular weld rod or wire with which it is desired to operate, the current is set so as to secure proper penetration of the workpiece by the arc. Thus, in the case of 1/16 inch wire, with a current of from 150 to 350 amperes, penetration of from 1/32 to 1/8 inch may be secured and with 5/64 inch wire, with a current of from 200 to 500 amperes, penetration of from 1/16 to 1/4 inch may be secured. The voltage will, of course, be that of the usual arc-welding current; viz., in the neighborhood of 40 v.

The wire feed mechanism is then set to feed the wire at the proper rate through the guide T, and no subsequent adjustment of the feed rolls while operating under the conditions thus established will be required. Immediately upon striking the arc by contacting the end of the wire projecting beyond the welding tool with the workpiece, the wire feed is automatically set in motion at such predetermined rate and the end of the wire which is thus kept advancing beyond the tool is melted down and intermingled with the so-called parent metal formed by the simultaneous melting of the workpiece or pieces to form the usual bead. As shown in Figure 1, the arc is thus struck and preferably kept submerged in a relatively deep layer of granular flux 25; which, at the same time as the bead is formed, will be at least in part rendered molten and provide a protective covering for the highly heated weld metal. In order to interrupt the operation, it is merely necessary to break the arc by withdrawing the tool from the workpiece with a quick movement exceeding in speed the advancing movement of the wire or by stopping the motor, the wire will automatically melt back to a point where the arc will no longer be sustained.

Thus, as set forth in the patent to Landis, using weld rod or wire of the relatively small diameter previously listed, with current of correspondingly high amperage and with conventional stickout of 3/4 inch, current densities running up to several hundred thousand amperes per square inch are obtained as shown by the following examples. Thus, taking a weldrod or wire of 3/64" d., a current of 400 a. and approximately 40 v. at the arc, such wire will be fed at the rate of 470 inches per minute, giving a wire burn-off of 0.23 lb. per minute. With a current of 500 a. and somewhat higher voltage; e. g., 45–48 v., the rate of feed of the same 3/64" d. wire will be 920 inches per minute, giving a wireburn-off of 0.45 lb. per minute. Similarly, taking 1.16" d. wire and a current of 500 a. and arc voltage of approximately 40 v., the rate of feed will be 290 inches per minute, giving a wire burn-off of 0.25 lb. per minute; while at 600 a. and voltage of approximately 45, the rate of feed will be 400 inches per minute, giving a wire burn-off of 0.40 lb. per minute.

The current density in amperes per square inch for the foregoing specific illustrations will upon calculation be found to be as follows; viz:

| Electrode Diameter, Inches | Current, Amperes | Current Density, Amperes per Square Inch |
| --- | --- | --- |
| 3/64 | 400 | 230,000 |
| 3/64 | 500 | 290,000 |
| 1/16 | 500 | 180,000 |
| 1/16 | 600 | 200,000 |

The resultant resistance heating of the terminal portion or stickout, even where the length thereof is no more than that utilized in normal arc-welding operation, produces surprising results due to the fact that, as previously pointed out, resistance heating increases as the square of the current and not in direct proportion thereto. The present invention contemplates employing two other important factors not heretofore apparent; namely, (1) the effect of increased time on such resistance heating and (2) the effect of the increasing temperature coefficient of resistivity of steel which rises sharply with increase of temperature.

Figure 3:
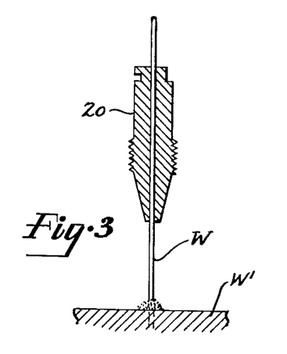
Figures 3 and 4 are diagrammatic views respectively illustrating different relations between such weld rod or wire and the workpiece.
Figure 4:
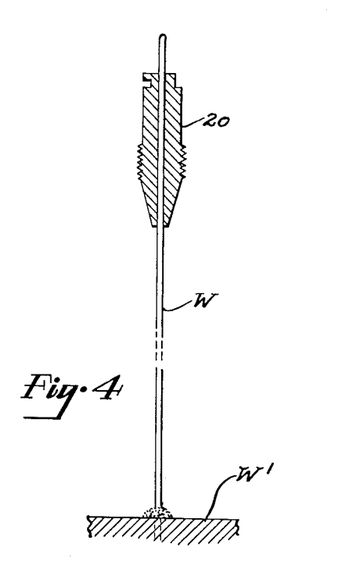

In a welding operation of the general character described above where the terminal portion or stickout of the weld rod is substantially 3/4 inch as in normal arc welding, this being the condition illustrated in Figure 3, it is, of course, necessary to establish a moving equilibrium in the temperature in such portion that is induced by the resistance heating thereof. This means that the rate of feed of a weld rod or wire of given diameter must be increased as the current density is increased, otherwise the distance between the arc tip and the workpiece will increase to the point where the arc will be interrupted. Even though the current density be such that the arc will be immediately reestablished when the extremity of the wire again touches the workpiece, there will be a momentary interruption, the frequency repetition of which will be undesirable.

However, where the current ($i$) is constant for an interval of time (*t*), the energy (H) in heat units is equal to $i^2Rt$, where R is the resistance which is determined by operating conditions. Accordingly, it follows that if a unit portion of the terminal portion or stickout of the weld rod or wire can be subjected to a longer period of resistance heating, the same amount of heat can be generated therein, or such unit portion brought to the same temperature by the time it reaches the arc with a lower current. Furthermore, the effectiveness of the current thus to heat such portion will increase as the temperature thereof rises due to the "temperature coefficient of resistance" of the metal whereof the rod is composed. Where, as usual in arc-welding operations, such metal is mild steel, such temperature coefficient is found to rise quite rapidly. Thus, for example, in the case of a steel having 6 points carbon and 38 points manganese, the resistivity in microhm-centimeters is found to be 17.8 at 100° C., 25.2 at 200° C., 44.8 at 400° C., 72.8 at 600° C., 107.3 at 800° C., 116.0 at 1000° C., and 124.1 at 1300° C. The change in resistivity per degree temperature rise thus continuously increases as the temperature of the steel increases.

Keeping the foregoing in mind, if now an arc-welding current is supplied to a weld rod or wire of the same diameter as illustrated in Figure 3 but having a terminal portion or stickout of twelve times the length there assumed, and the rate of feed is adjusted so as to establish, as before, a moving temperature equilibrium such that the temperature at any given point in such portion will remain substantially constant, the maximum temperature obtained before can now be obtained with current of much lower amperage; i. e., with a much lower current density in the weld rod or wire.

Figure 5:
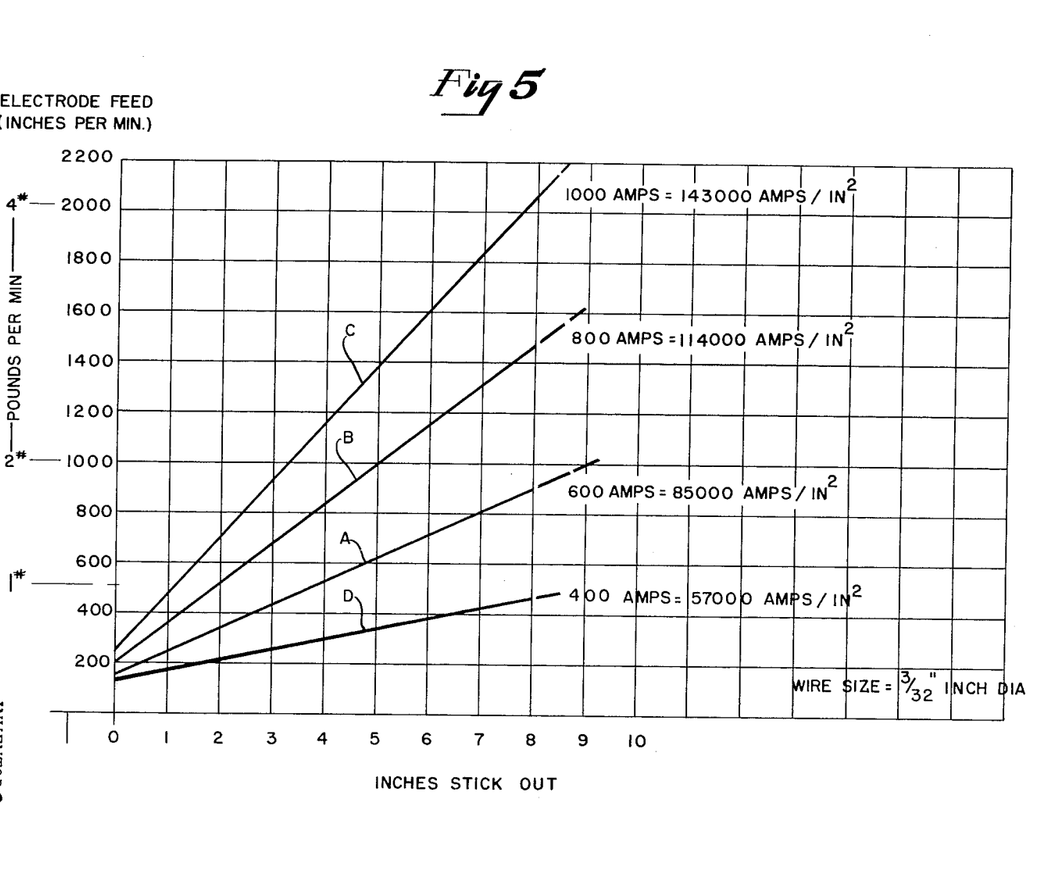
Figure 5 is a chart showing the relation of certain newly discovered factors which enter into our improved arc-welding process.

Alternatively, with the expenditure of the same amount of energy; i. e., by imposing a current of the same amperage as before on such longer terminal portion, a higher maximum temperature, due to resistance heating, may be obtained. Indeed, it is possible and desirable for the maximum possible melt-off rates that such maximum temperature should approach the melting point of the weld rod or wire at the arc end or tip thereof. For example, where the weld rod or wire employed in the welding operation is of mild steel having an analysis on the order of that indicated above, the density of the current in relation to the length of such terminal portion of the electrode can be readily made such as to heat the latter by resistance heating to above 2000° F., indeed to approximately 2500° F.; i. e., just short of the melting point. The striking results thus obtainable are graphically illustrated in the chart, Figure 5, on which abscissas represent a successively increasing length of the terminal portion or stickout of the electrode and the ordinates represent the rate of electrode feed in inches per minute. The four curves A, B, C and D shown on the chart respectively illustrate the relation between such wire feed in both inches and pounds per minute and length of terminal portion or stickout obtainable with currents of 600 amperes, 800 amperes, 1000 amperes and 400 amperes, using a weld rod or wire of 3/32 inches diameter. The corresponding current densities in amperes per square inch are also shown for each of the operating conditions in question. As clearly appears from this chart, due to the additional factors mentioned above; viz., that of the increase in time during which the continuously moving weld rod or wire is subjected to resistance heating, and to increase in the temperature coefficient as the temperature of the weld rod or wire rises, the rate at which such weld rod or electrode is melted down is increased to a surprising extent by the present improvement in arc welding. The rate of wire feed, of course, also is increased as the rate at which the weld rod or wire is melted down increases. Such latter rate may be readily calculated from the aforesaid chart, Figure 5. Thus, using a weld rod or wire of 3/32" O. D., where the terminal portion or stickout is 8 inches in length, 1.76 pounds per minute of electrode will be melted down using a current of 600 amperes, 2.90 pounds per minute using 800 amperes, and 4.07 pounds per minute using 1000 amperes. These melt-off rates for a given arc current may be increased by reducing the size of the electrode.

From the foregoing, it will be seen that instead of merely utilizing resistance heating to produce a portion of the heat in the terminal portion or stickout of the metal electrode, practically the entire amount of heat required to melt such stickout is derived in this manner and the additional heat derived from the arc serves primarily to melt down the necessary amount of the workpiece or parent metal required to form the finished weld. Also, the resistance heating is used in a more efficient manner. A radically different concept of the function of the arc in welding is thus introduced.

We have given above the figures for the increase in resistivity with increase in temperature only in the case of a steel electrode of one particular analysis. Obviously, this resistivity factor will vary with different steels and with other metals, such as copper and aluminum. The density of the current in relation to this factor may be more generally defined by stating that such density in relation to the length of the terminal portion of the electrode should be such that the latter at the arc end thereof will have a resistivity at least four times its resistivity at room temperature due to resistance heating.

Figure 6:
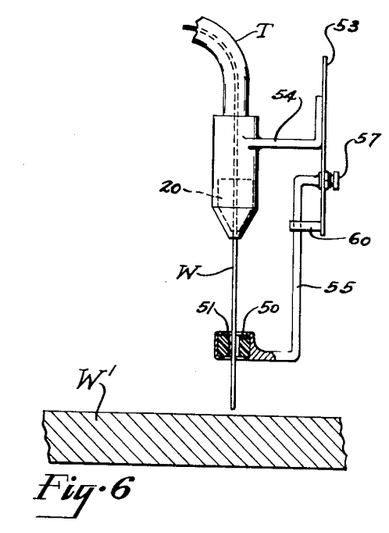
Figures 6, 7 and 8 are side elevational views partly in cross section and somewhat diagrammatic showing apparatus specifically embodying the invention.
Figure 7:
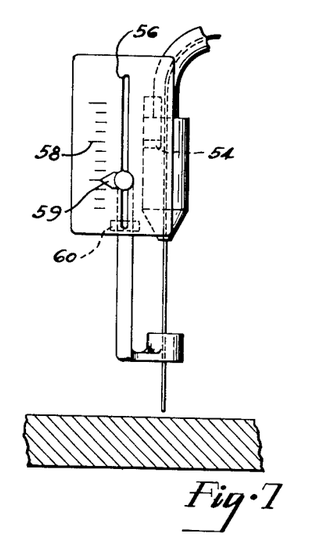

Referring now to Figures 6 and 7, apparatus is there shown particularly adapted to carry out the present invention. In the embodiments here shown, guide means are provided between the nozzle 20 and the workpiece W' for the purpose of guiding the stickout end of the electrode in its path of movement from the nozzle toward the workpiece and, thus, preventing the end of the electrode from wandering or flipping around and, thus, causing crooked or ragged weld beads. In the embodiment shown, the guide means comprise generally a washer 50 having a central opening 51 generally aligned with the opening in the nozzle 20 through which the stickout portion of the electrode W passes. This washer 50 is supported in operative relationship with the nozzle 20 by a bracket assembly including a plate-like member 53 fixedly mounted to one side of the nozzle 20 by a horizontally extending arm 54 and a support arm mounted on the plate 53 and extending downwardly therefrom and thence horizontally to mount the washer 50 in an opening in the lower end thereof. The plate 53 has an elongated slot 56 generally parallel to the path of movement of the electrode W and the upper end of the arm 54 passes therethrough and is clamped in position relative to the plate 53 by means of a nut 57 or the like. As shown, the plate member 53 may have graduations 58 therealong and a pointer or indicator 59 may be provided on the upper end of the arm 54 so as to indicate the relative position of the lower end of the arm 54 relative to the workpiece W'. A bracket 60 on the back side of the plate member 53 guides and supports the arm 54 in its position relative to the nozzle 20.

It will thus be seen that by adjusting the position of the arm 54 on the plate 53, a ready adjustment for the stickout length may be provided, which stickout length, assuming that the normal stickout distance from the lower side of the washer 50 to the workpiece W is maintained at 3/4 of an inch, may be readily indicated by the scale 58.

Preferably, the washer 50 should be of an electrical insulating material having heat-resistant characteristics. By such an arrangement, it will be appreciated that the arm 55 and plate 53 will be thus electrically insulated from both the electrode W and the workpiece W'. Obviously, if desired, the washer 50 could be dispensed with if the problems of electrical voltages appearing on the arm 55 and plate member 53 are not objectionable. In this case, the arm 54 should be insulated from the nozzle 20.

Obviously, the scale 58 can be graduated in terms of melt-off rate and electrode current for any given size electrode or may indicate any of the other variable relationships which may be obtained as pointed out hereinabove by varying the stickout distance of the electrode beyond the nozzle 20.

Figure 8:
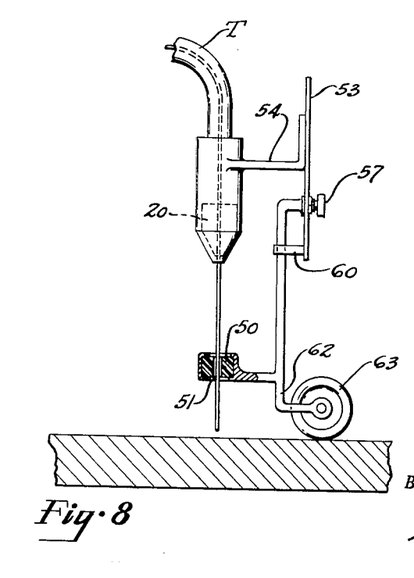

Figure 8 is a view similar to Figures 6 and 7 with the exception that physical means have been provided for physically and accurately spacing the electrode nozzle 20 from the workpiece W'. Thus, in the embodiment shown in Figure 8, the lower end of the arm 55' is provided with an extension 62, at the lower end of which is mounted a wheel 63, which wheel is adapted to engage the surface of the workpiece and permit friction-free movement of the nozzle 20 in a direction parallel to the surface of the workpiece W'. Obviously, other means could be provided for physically spacing the electrode nozzle 20 from the workpiece. Also, if desired, the wheel 63 can be power driven by an electric motor, either mounted close to the wheel 63 or remotely thereto and connected therewith through a long flexible drive cable. In such event, the lineal speed of the electrode along the surface of the workpiece W' may be very accurately controlled in relation to the melt-off rate and the welding current so that extremely high-speed, but very uniform welds, may be obtained.

Generally speaking, it may be said that the invention comprises an electrode nozzle or contact block, means for continuously feeding an electrode wire of indeterminate length and of a diameter of ⅛ inch or less through or past said nozzle toward a workpiece and means for energizing said nozzle with a voltage to cause a current in the electrode between the nozzle and the workpiece having a density such as to substantially heat the electrode by the passage of the current therethrough, the electrode nozzle being spaced from the workpiece by a distance of 1½ inches or more.

The washer 50 is shown as having a relatively short dimension in the axial length of the electrode. Its length may be adjusted to correspond generally to that of the stickout which will probably be used. By so adjusting the length, the amount of free or unsupported electrode between the contact block 20 and the upper surface of the washer 50 can be held to a minimum. It is preferred that the upper surface of the washer 50 be close enough to the exit end of the contact block 20 so that the electrode, when it enters the opening 51, will have a substantial rigidity; that is to say, it will not be heated to or above the plastic temperature.

The invention has other very important practical aspects, particularly in the welding of thin metal sheets or the like where the depth of current penetration or undercut in the workpiece is considered critical. As is known, the depth of penetration is primarily controlled by the strength of the arc current and the rate of the arc movement along the surface of the metal workpiece. In the prior art, if the depth of penetration was too great, the arc current had to be reduced. This reduced the volume of metal which could be deposited and, thus, the linear speed of the welding operation. Alternatively, the arc current could be maintained and the speed of movement of the arc across the surface of the workpiece could be increased, in which event it was difficult to deposit a sufficient amount of metal along the weld line to produce a satisfactory weld. However, using the present invention, an operator need merely select an arc current and rate of movement of the arc across the surface of the workpiece to provide the desired amount of penetration and then adjust the length of the stickout to give him the desired amount of melt off for that arc current and that rate of movement.

This point may be emphasized by the fact that if a welding operation using 400 amperes on ⅛ inch diameter wire and ¾ inch stickout on 14 gauge metal sheets is desired to be changed so as to weld 16 gauge sheets, then, generally, the 400 amperes used for the 14 gauge sheet will give too much penetration and actually perforate the thinner 16 gauge sheets. The operator can do one of two things, either hold the current the same and speed up the lineal movement of the welding head along the workpiece while, at the same time, increasing the stickout so as to increase the melt-off rate, or he may hold the speed of movement along the workpiece the same, reduce the welding current and, at the same time, increase the stickout to increase the melt-off rate so that the weld will continue with the same quality as before.

As stated, the invention makes full use of two little appreciated facts about the resistivity of metals as their temperature changes. Thus, as a unit length of the electrode moves from the contact block, it is heated by the passage of the current therethrough. This heating causes the electrical resistance of the unit length to increase rapidly and in increasingly greater amounts for each degree of temperature rise. Thus, as the rate of heating is directly proportional to the resistance, it will be seen that there is a progressively increasing rate of heating in any unit length as it advances from the contact block to the arc end of the electrode. This change in resistivity operates in such a manner as to, in effect, cause the melt-off rate to vary approximately by the cube of the current. This may in part be explained by the fact that if it is assumed that a current density, stickout length and rate of electrode feed has been selected so that the current flowing through the electrode will have heated the end of the electrode to a temperature somewhat removed from the melting point independently of the heat of the arc and the current is then increased by a given amount, this increase will, obviously, tend to increase the temperature of the end of the electrode. However, because there is such a steep gradient on the change of resistivity of the electrode end at these elevated temperatures, there will be a dual increase in heating effect; namely, that due to the square of the current as is well known and that due to the very high rate in the change of the resistivity of the metal, the result being that the melt-off rate appears to vary by approximately the cube of the current.

In observing welding operations using an increased length of stickout as taught by the present invention, it is noted that the electrode is at a red heat over a very substantial portion of its length as distinguished from welding operations employing conventional length of stickout wherein only the extreme tip of the electrode is at a red heat, which heat may be, in part, attributed by heat absorbed from the arc itself.

Also, the invention may be said to comprise apparatus of the type just described wherein means are provided between the electrode nozzle and the workpiece insulated therefrom for the purpose of guiding the free electrode end in its path of movement from the nozzle toward the workpiece. Also, the invention may be said to comprise means adjustably mounted relative to the electrode nozzle and adapted to engage the workpiece to physically space the electrode nozzle from the workpiece to maintain the physical spacing desired.

The apparatus described for carrying out the invention has been shown relatively schematically. Obviously, the apparatus as well as the method is subject to wide variation without deviating from the invention, at least insofar as such modifications come within the scope of the appended claims.

Having thus described our invention, we claim:

1. In a method of arc welding wherein an arc is established between a metallic workpiece and the end of a metallic electrode, the steps which comprise striking an arc between the end of such electrode and workpiece and, thereupon, continuously feeding such electrode to such workpiece while continuously passing through the terminal portion of such electrode an arc-welding current of high density, the length of such terminal portion traversed by such current in relation to the rate of feed of said electrode being such that said current serves to raise the arc end of such portion by resistance heating thereof to a temperature near the melting point.

2. In a method of arc welding wherein an arc is established between a metallic workpiece and the end of a metallic electrode, the steps which comprise striking an arc between the end of such electrode and workpiece and, thereupon, continuously feeding such electrode to such workpiece while continuously passing through the terminal portion of such electrode an arc-welding current of high density, the length of such terminal portion traversed by such current in relation to the rate of feed of said electrode being such that said current serves to raise the arc end of such portion by resistance heating thereof independently of the heat from the arc to a temperature within six hundred degrees F. of the melting point.

3. In a method of arc welding wherein an arc is established between a steel workpiece and the end of a steel electrode, the steps which comprise striking an arc between the end of such electrode and workpiece and, thereupon, continuously feeding such electrode to such workpiece while continuously passing through the terminal portion of such electrode an arc-welding current of high density, the length of such terminal portion traversed by such current in relation to the rate of feed of said electrode being such that said current serves to raise the arc end of such portion by resistance heating thereof independently of the heat from the arc to a temperature of approximately 2500° F.

4. In a method of arc welding wherein an arc is established between a steel workpiece and the end of a steel electrode, the steps which comprise striking an arc between the end of such electrode and workpiece and, thereupon, continuously feeding such electrode to such workpiece while continuously passing through the terminal portion of such electrode an arc-welding current, the density of such current in relation to the length of such terminal portion traversed thereby being such as to heat the arc end of the latter by resistance heating independently of the heat from the arc to a temperature of above 2000° F.

5. In a method of arc welding wherein an arc is established between a steel workpiece and the end of a steel electrode, the steps which comprise striking an arc between the end of such electrode and workpiece and, thereupon, continuously feeding such electrode to such workpiece while continuously passing through the terminal portion of such electrode an arc-welding current, the density of such current in relation to the length of such terminal portion traversed thereby being such as to heat the arc end of the latter by resistance heating independently of the heat from the arc to a temperature of approximately 2500° F.

6. In a method of arc welding wherein an arc is established between a steel workpiece and the end of a steel electrode, the steps which comprise striking an arc between the end of such electrode and workpiece and, thereupon, continuously feeding such electrode to such workpiece while continuously passing through the terminal portion of such electrode an arc-welding current, the density of such current in relation to the length of such terminal portion traversed thereby being such that the latter at the arc end thereof independently of the heat from the arc has a resistivity of above 100 microhm-centimeters due to resistance heating.

7. In a method of arc welding wherein an arc is established between a metallic workpiece and the end of a metallic electrode, the steps which comprise striking an arc between the end of such electrode and workpiece and, thereupon, continuously feeding such electrode to such workpiece while continuously passing through the terminal portion of such electrode an arc-welding current, the length of such terminal portion traversed by said current being such that said portion at the arc end thereof independently of the heat from the arc has a resistivity of at least four times its resistivity at normal room temperature due to resistance heating.

8. In a method of arc welding wherein an arc is established between a metallic workpiece and the end of the terminal portion of a metallic electrode, the steps which comprise striking an arc between the end of such electrode and workpiece and, thereupon, continuously feeding such electrode to such workpiece while continuously passing through the terminal portion an arc-welding current, the length of such terminal portion traversed by such current in relation to the rate of feed and the diameter of such electrode being such that said current will raise the arc end of such portion independently of the heat from the arc by resistance heating thereof to a temperature above 1200° F.

9. In a method of arc welding wherein an arc is established between a metallic workpiece and the end of a metallic electrode, the steps which comprise continuously feeding a small-diameter electrode toward said workpiece, continuously feeding an electric current to said electrode at a distance from the workpiece in excess of 1½ inches with the density of said current flow in said electrode being sufficient to heat a portion theerof to a temperature in excess of 1000° F. independently of the heat from the arc.

10. In a method of arc welding wherein an arc is established between a metallic workpiece and the end of a metallic electrode, the steps which comprise continuously feeding an electrode having a diameter less than ⅛ of an inch in diameter toward said workpiece while continuously energizing said electrode from a point spaced at least 1½ inches from said workpiece with an electric current of such a value as to provide a current density in the electrode which will substantially heat the end of the electrode to an elevated temperature at least above 500° F. independently of the heat from the arc.

11. The combination of claim 2, including the additional step of continuously guiding the terminal portion of the electrode at a point between the arc end thereof and the point of electrical energization thereof.

12. Arc welding apparatus for forming a deposited weld bead on a workpiece by continuously advancing a wire electrode toward a workpiece while maintaining an arc between the end of such electrode and the workpiece, comprising in combination; electrode feed means for advancing said electrode toward said workpiece and electrode energizing means including a contact member past which the electrode is advanced in electrical contact therewith, means adjustably spacing said member from said workpiece a distance of at least 3 inches, and a high capacity power source connected to said members and having a voltage output under load such as to cause a current to flow in the free electrode end after it passes said contact member of a value to heat the electrode end independently of the heat of the arc to a temperature in excess of 1500° F. whereby said electrode end loses its rigidity and normally tends to move from the extended line of movement past the contact member and thus the desired line of weld bead and insulating guide means adjustably positioned adjacent the arcing end of the electrode through which the free end of said electrode is guided for preventing such movement and holding the electrode end in its extended line of movement whereby a straight edged weld seam can be obtained.

13. Arc welding apparatus for forming a deposited weld bead on a workpiece by continuously advancing a wire electrode toward a workpiece while maintaining an arc between the end of such electrode and the workpiece, comprising in combination; electrode feed means for advancing said electrode toward said workpiece and electrode energizing means including a contact member past which the electrode is advanced in electrical contact therewith, means spacing said member from said workpiece a distance of at least 3 inches, and a high capacity power source connected to said members and having a voltage output under load such as to cause a current to flow in the free electrode end after it passes said contact member of a value to heat the electrode end independently of the heat of the arc to a temperature in excess of 1500% F. whereby the electrode end loses its rigidity and normally tends to move from the extended line of movement past the contact member and thus the desired line of weld bead and insulating guide means adjustably positioned adjacent the arcing end of the electrode through which the free end of said electrode is guided for preventing such movement and holding the electrode end in its extended line of movement whereby a straight edged weld seam can be obtained.

14. Arc welding apparatus for forming a deposited weld bead on a workpiece by continuously advancing a wire electrode toward a workpiece while maintaining an arc between the end of such electrode and the workpiece, comprising in combination; electrode feed means for advancing said electrode toward said workpiece and electrode energizing means including a contact member past which the electrode is advanced in electrical contact, means adjustably spacing said member from said workpiece a distance of at least 3 inches, and a high capacity power source connected to said members and having a voltage output under load such as to cause a current to flow in the free electrode end after it passes said contact member of a value to heat the electrode end independently of the heat of the arc to a temperature in excess of 1500° whereby said electrode end loses its rigidity and normally tends to move from the extended line of movement past the contact member and thus he desired line of weld bead and insulating guide means positioned adjacent the arcing end of the electrode through which the free end of said electrode is guided for preventing such movement and holding the electrode end in its extended line of movement whereby a straight edged weld seam can be obtained.

15. Arc welding apparatus for forming a deposited weld bead on a workpiece by continuously advancing a wire electrode toward a workpiece while maintaining an arc between the end of such electrode and the workpiece, comprising in combination; electrode feed means for advancing said electrode toward said workpiece and electrode energizing means including a contact member past which the electrode is advanced in electrical contact therewith, means spacing said member from said workpiece a distance of at least 3 inches, and a high capacity power source connected to said members and having a voltage output under load such as to cause a current to flow in the free electrode end after it passes said contact member of a value to heat the electrode end independently of the heat of the arc to a temperature in excess of 1500° F. whereby said electrode end loses its rigidity and normally tends to move from the extended line of movement past the contact member and thus the desired line of weld bead and insulating guide means positioned adjacent the arcing end of the electrode through which the free end of said electrode is guided for preventing such movement and holding the electrode end in its extended line of movement whereby a straight edged weld seam can be obtained.

16. Arc welding apparatus for forming a deposited weld bead on a workpiece by continuously advancing a wire electrode toward a workpiece while maintaining an arc between the end of such electrode and the workpiece, comprising in combination; electrode feed means for advancing said electrode toward said workpiece and electrode energizing means including a contact member past which the electrode is advanced in electrical contact therewith, means spacing said member from said workpiece a distance of at least 3 inches, and a high capacity power source connected to said members and having a voltage output under load sauch as to cause a current to flow in the free electrode end after it passes said contact member of a value to heat the electrode end independently of the heat of the arc to a temperature in excess of 1500° F. whereby said electrode end loses its rigidity and normally tends to move from the extended line of movement past the contact member and thus the desired line of weld bead and insulating guide means positioned adjacent the arcing end of the electrode through which the free end of said electrode is guided for preventing such movement and holding the electrode end in its extended line of movement whereby a straight edged weld seam can be obtained, and an index scale for indicating the relative location of said guide relative to said contact member.

References Cited in the file of this patent

UNITED STATES PATENTS

| | | |
|---|---|---|
| 1,827,245 | Lincoln | Oct. 13, 1931 |
| 2,289,938 | Smith | July 14, 1942 |
| 2,628,301 | Dahl | Feb. 10, 1953 |